(12) United States Patent
Nagai

(10) Patent No.: US 6,571,263 B1
(45) Date of Patent: May 27, 2003

(54) RANDOM NUMBER GENERATING APPARATUS

(75) Inventor: Gouichiro Nagai, Tokyo (JP)

(73) Assignees: System Industrial Laboratory Do., LTD, Tokyo (JP); Japan Science and Technology Corporation, Saitama (JP)

( * ) Notice: Subject to any disclaimer, the term of this patent is extended or adjusted under 35 U.S.C. 154(b) by 0 days.

(21) Appl. No.: 09/377,041

(22) Filed: Aug. 19, 1999

(30) Foreign Application Priority Data

Aug. 19, 1998 (JP) ............................................. 10-232823

(51) Int. Cl.[7] ............................. G06J 1/00; G06F 7/58; G06G 7/00
(52) U.S. Cl. ............................. 708/3; 708/255; 708/801
(58) Field of Search ............................. 708/3, 250–251, 708/255, 801

(56) References Cited

U.S. PATENT DOCUMENTS

| | | | |
|---|---|---|---|
| 3,790,768 A | * 2/1974 | Chevalier et al. | ........... 708/251 |
| 4,169,249 A | 9/1979 | Hoffmann et al. | |
| 4,176,399 A | * 11/1979 | Hoffmann et al. | .......... 708/250 |
| 4,339,697 A | * 7/1982 | Franz | .......... 318/341 |
| 4,355,366 A | * 10/1982 | Porter | .......... 708/255 |
| 4,799,259 A | * 1/1989 | Ogrodski | .......... 708/251 |
| 4,853,884 A | * 8/1989 | Brown et al. | .................. 708/3 |
| 6,070,178 A | * 5/2000 | Anderson et al. | .............. 708/3 |
| 6,195,669 B1 | * 2/2001 | Onodera et al. | ............... 708/3 |

* cited by examiner

Primary Examiner—Tan V. Mai
(74) Attorney, Agent, or Firm—Fish & Richardson P.C.

(57) ABSTRACT

A random number generating apparatus which is suitable for miniaturization and which can easily generate binary random numbers that are cryptographically secure is provided. The apparatus comprises: a semiconductor device having a junction; reverse bias applying circuit for applying a reverse bias voltage of a degree so as to cause a breakdown current in the junction; and a binarizing circuit for binarizing a noise signal created in a current path including said junction for generating random numbers from the binarized signal.

14 Claims, 4 Drawing Sheets

RANDOM NUMBER GENERATING APPARATUS

BACKGROUND OF THE INVENTION

1. Field of the Invention

The present invention relates to a random number generating apparatus, more particularly, to a random number generating apparatus that is used as a random number source for an encryption algorithm.

2. Description of the Related Background Art

In association with the development of the Internet and Intranet, new market areas such as international transactions, transactions among different industries, electronic data interchange (EDI), and the like are being actively exploited. Due to openness of the Internet, it is necessary to take countermeasures against illegal acts (tapping, falsification, pretending, destructive action, and the like) on information signals transmitted and received in communication networks. Development of a security technique is urgently demanded.

Encryption technology is widely used to assure the security of communication networks. For example, there is a digital signature algorithm (DSA) standardized in the U.S. In encryption devices employing such an algorithm, it is necessary to generate random numbers each time a signature is generated. Random numbers to be used in the devices are desirable to be "information-theoretically (cryptographically) secure".

The "cryptographically secure" random numbers denote random numbers which satisfy a condition such that "other bits cannot be estimated from an arbitrary part of a random number sequence with a probability of more than 50%". Since the condition is very strict, however, the following evaluation measures may practically be used. That is, (1) equality between occurrence frequency of 0 and that of 1,
(2) long periodicity,
(3) non-linearity,
(4) high linear complexity, and
(5) non-correlation.

These are necessary conditions. Non-linearity denotes that random numbers are not an output itself of a linear feedback shift register. The maximum period of a sequence which can be generated by linear feedback shift registers of a stages is equal to $2^n-1$. The sequence of the period $2^n-1$ is called an M sequence (maximum length shift register sequence). The M sequence, therefore, which is often used as pseudo-random numbers does not satisfy the non-linearity condition.

The linear complexity of the random number sequence denotes the minimum and equivalent number of stages of the linear feedback shift registers to generate the sequence. In case of the M sequence with the period $2^n-1$ as an example, since it is a sequence of the maximum period that is generated by the linear feedback shift registers of n stages, the linear complexity of the M sequence is equal to n. When the linear complexity is low, an equivalent random number generator can be readily constructed. Thus the random numbers of low linear complexity cannot be cryptographically secure, since unknown bits are easily predicted.

Non-correlation denotes that, for example, the bits in a portion of random numbers are independent from those of the other portions. When there is a correlation, on the contrary, unknown bits can be easily estimated.

Hitherto, as a random number source of the encryption algorithm, pseudo-random numbers have generally been used. The pseudo-random numbers, however, cannot be cryptographically secure in view of the above-mentioned evaluation measures. That is, since the pseudo-random numbers are generated by a certain arithmetic process or a combination of functions, the same random numbers can be generated by giving the same initial conditions. An encryption method using the pseudo-random numbers can be, therefore, easily predicted and the generated cipher readily deciphered. It is insufficient in terms of ensuring security.

As a method of generating random numbers that is close to "truly" random numbers, there is an apparatus utilizing a natural phenomenon, for example, a decay of a radioactive material or the like. It has, however, a drawback that the apparatus is large and complicated.

Thus, a random number generating apparatus of compact size which achieves high security and can be easily assembled in a personal computer or the like is therefore demanded.

OBJECT AND SUMMARY OF THE INVENTION

The invention is made in consideration of the aforementioned drawbacks and it is an object to provide a random number generating apparatus and the method for generating binary random numbers which are cryptographically secure and is adapted for miniaturization.

A random number generating apparatus according to the present invention comprises: a semiconductor device having a junction; reverse bias applying circuit for applying a reverse bias voltage of a degree so as to cause a breakdown current in the junction; and a binarizing circuit for binarizing a noise signal created in a current path including said junction for generating random numbers from the binarized signal.

DETAILED DESCRIPTION OF THE PREFERRED EMBODIMENTS

Embodiments of the invention will be described in detail hereinbelow with reference to the drawings.

Figure 1:
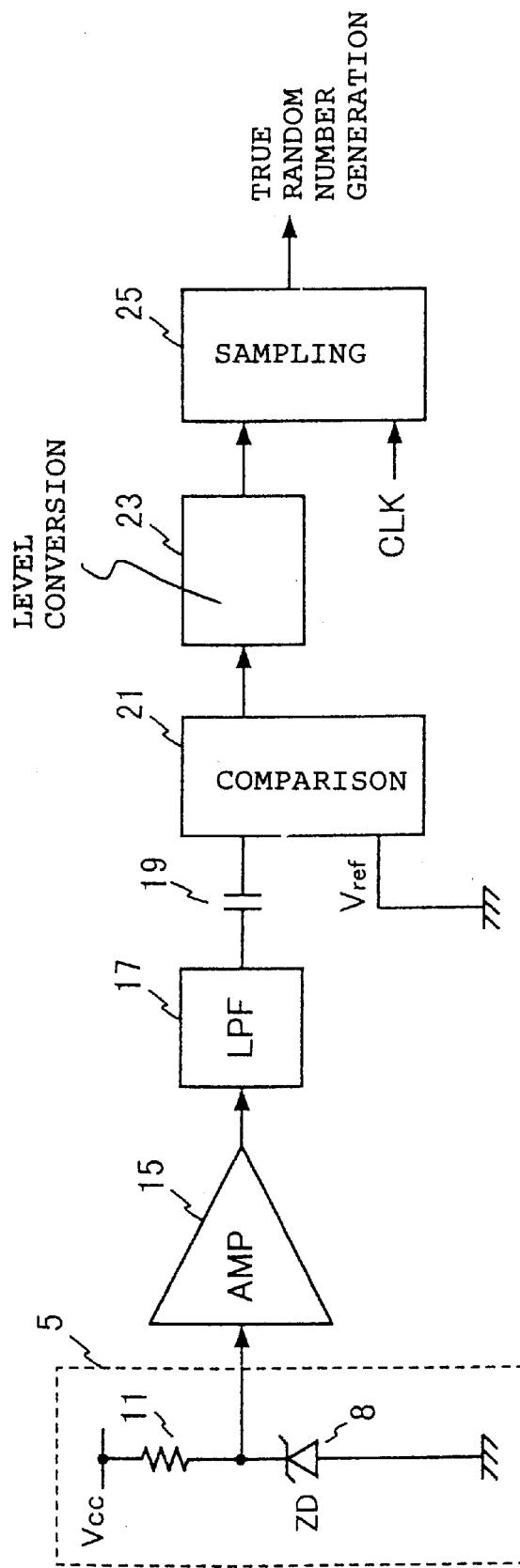
FIG. 1 is a diagram showing a configuration of a random number generating apparatus according to the first embodiment of the present invention.
Figure 2:
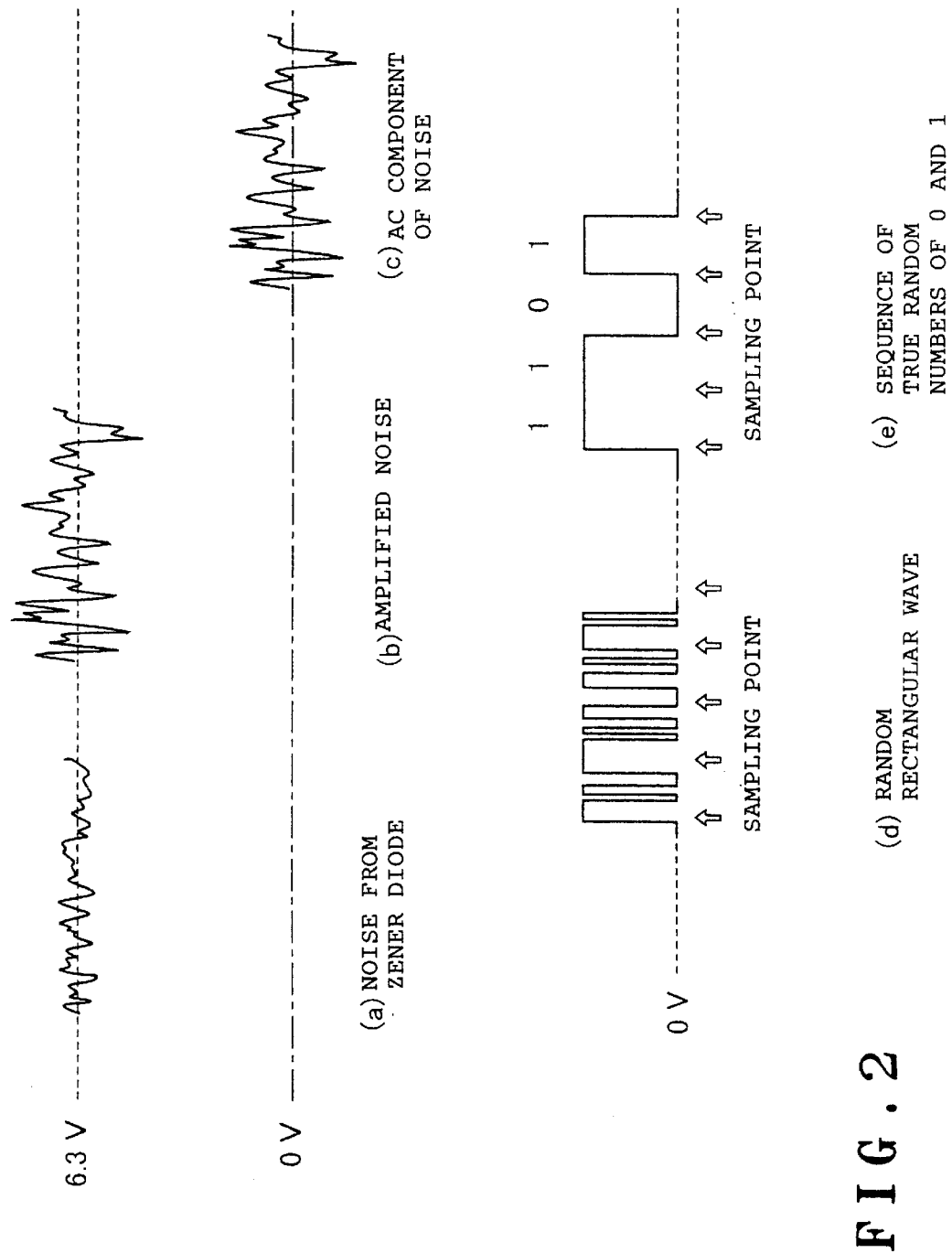
FIG. 2 illustrates the operation of the random number generating apparatus shown in FIG. 1.

FIG. 1 schematically shows a configuration of a random number generating apparatus according to the first embodiment of the present invention. FIG. 2 illustrates the operation of the random number generating apparatus shown in FIG. 1.

In FIG. 1, reference numeral 5 denotes a noise generating circuit. A reverse bias voltage at which a slight amount of breakdown occurs is applied to a pn junction of a Zener diode 8 via a resistor 11. A feeble or weak breakdown current consequently flows in the reverse direction and random noise voltages are generated. By making the Zener diode 8 operative as mentioned above, a random noise voltage output of about tens to hundreds $\mu$V as peak-to-peak voltages around a Zener voltage is generated. The generated random noise voltage can be used as a generating source of the random numbers.

Specifically, a power voltage Vcc is set to +12V and a Zener diode 8 having a Zener voltage of 6.3V, which is equal to about ½ of the power voltage, is used.

By applying a reverse bias voltage to the Zener diode 8 via the resistor 11 having a resistance of 560 k$\Omega$, a reverse current of about 10 $\mu$A flows within the diode. Noise voltage signal having a peak-to-peak voltage of 20 $\mu$V around 6.3V and an average frequency of approximately 60 to 70 kHz is generated (refer to FIG. 2(a)).

Since the noise voltage signal generated in the noise generating circuit 5 is feeble or weak, the signal is amplified in an amplifying circuit 15. Specifically, operational amplifiers of two stages are used in the amplifying circuit 15. A voltage gain of the amplifying circuit 15 is about 74 dB and an amplified signal with a peak-to-peak voltage of about 1V around 6.3V can be obtained (refer to FIG. 2(b)).

The noise signal amplified in the amplifying circuit 15 is supplied to a low pass filter 17 in which a high frequency component is removed. A cut-off frequency of the low pass filter 17 may be about a few times as high as a sampling frequency, as will be described later. An output signal of the low pass filter 17 is supplied to a comparison circuit 21. The comparison circuit 21 determines whether the supplied signal is higher or lower than a predetermined threshold value, thereby obtaining a binarized signal.

Since the amplified noise output of the amplifying circuit 15 is almost symmetrical with respect to the Zener voltage of 6.3V, the amplified noise voltage signal can be binarized by using the Zener voltage as a reference. In the embodiment, a ground voltage is used as a reference since the voltage is very stable. That is, by using a coupling capacitor 19, an AC component obtained by cutting out a DC component in the amplified noise signal is supplied to the comparison circuit 21 (refer to FIG. 2(c)). The binarization process using the ground voltage (0V) as a threshold value can be consequently performed. In the configuration, even when the Zener voltage varies due to a temperature change, only the DC component varies. The binarization process is not influenced by the Zener voltage change at all. The peak-to-peak voltage around 0V of the AC component in the amplified noise signal is about 1V. The AC component is supplied to an input terminal of the comparison circuit 21 and the binarization process using 0V of the ground voltage as a threshold value is performed.

An output signal of the comparison circuit 21 is supplied to a level converting circuit 23 and is converted into a logical voltage level of a sampling circuit 25 at the post stage.

An output signal of the level converting circuit 23 is a random rectangular wave having no periodicity (refer to FIG. 2(d)). The rectangular wave is supplied to the sampling circuit 25.

The sampling circuit 25 samples the input rectangular wave with a predetermined frequency which is lower than the frequency of the input rectangular wave, for example, a few tenths of the frequency of the input rectangular wave or lower, thereby obtaining a sequence consisting of bits of 0 and 1. Since the input rectangular wave has no periodicity and a sampling timing is independent of the frequency of the input rectangular wave, if an occurrence probability of 0 and of 1 of the obtained bit sequence are equal, it can be expected that the sequence is a truly random number sequence.

The truly random number sequence consisting of 0 and 1 obtained by the sampling circuit 25 is supplied to an external device, for example, an encryption device through an external interface (not shown) such as an RS-232C interface or the like. The sampling frequency needs to be set to a bit rate required by the external device.

As mentioned above, according to the present invention, by using the noise signal which occurs when a reverse bias voltage with an approximate magnitude of a breakdown voltage is applied to the semiconductor junction as a generating source of random numbers, binary truly-random numbers can be easily generated. Since the circuit can be easily provided in the form of an IC, a random number generating apparatus of very small size can be realized.

By assembling the present apparatus as a "truly random number generating engine" into, for example, a personal computer or the like, "truly random numbers (physical random numbers)" for generating a signature using the digital signature algorithm can be provided. That is, communications with much higher security than that in a conventional case using pseudo-random numbers can be performed.

Figure 3:
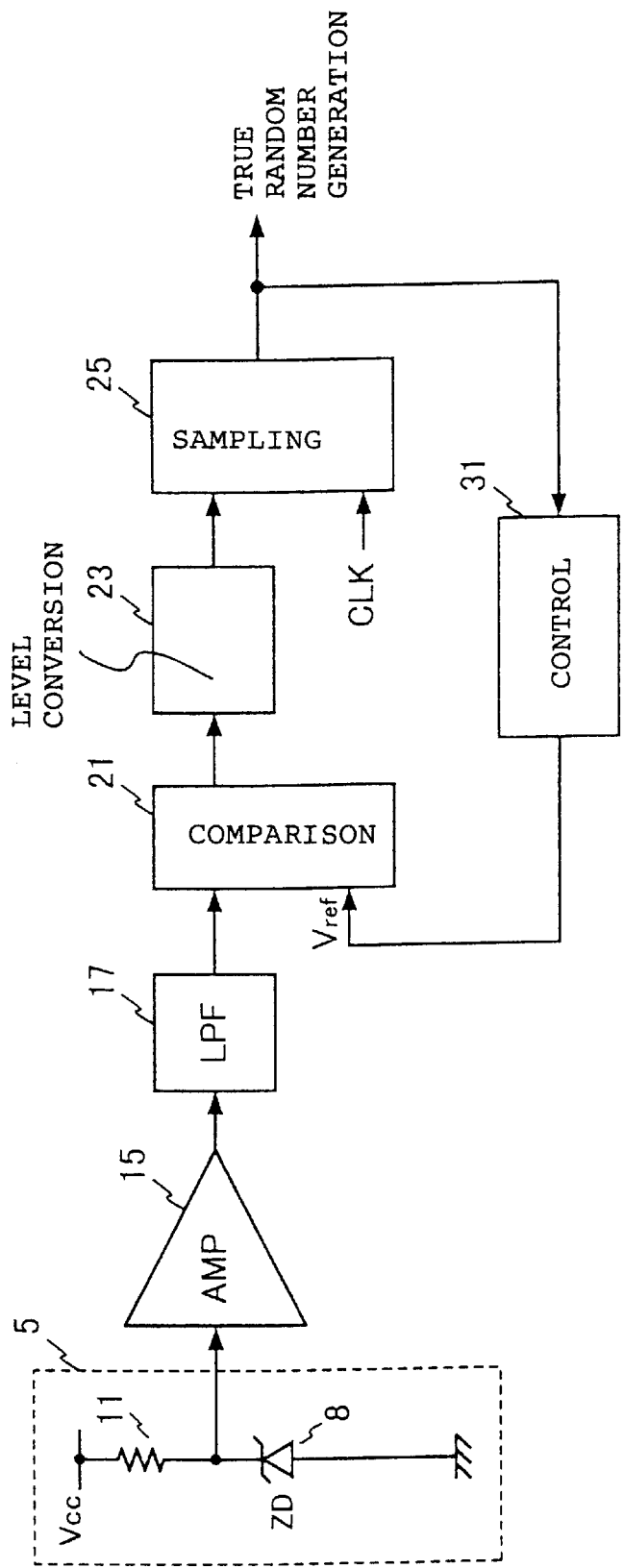
FIG. 3 is a diagram showing a configuration of a random number generating apparatus according to the second embodiment of the present invention.

FIG. 3 shows a configuration of a random number generating apparatus according to the second embodiment of the present invention.

The second embodiment differs from the first embodiment in that a control unit 31 is provided so as to control the equal occurrence probabilities of 0 and 1 of the obtained random number sequence.

That is, the control unit 31 obtains an output signal of the sampling circuit 25 and controls a reference voltage Vref which is applied to the comparison circuit 21 so that an accumulation value of the duration period of the high level voltage and that of the duration period of the low level voltage in the output are equalized.

By providing the control unit 31 for controlling the reference voltage Vref, the occurrence probabilities of 0 and 1 in the random number sequence of the random number generating apparatus can be equalized. A binary random number sequence which can be regarded to be truly random is obtained.

Figure 4:
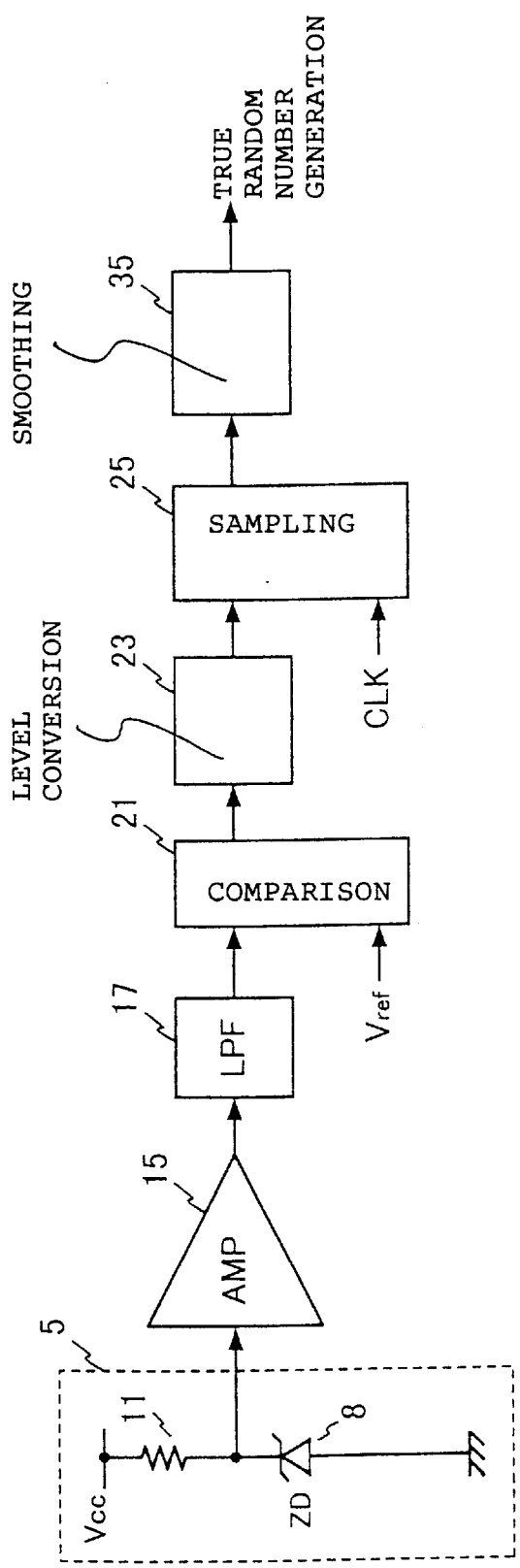
FIG. 4 is a diagram showing a configuration of a random number generating apparatus according to the third embodiment of the present invention.

FIG. 4 shows a configuration of a random number generating apparatus according to the third embodiment of the present invention.

The third embodiment differs from the first and second embodiments in that a smoothing unit 35 for performing a smoothing process so as to equalize the occurrence probabilities of 0 and 1 in the random number sequence obtained by the sampling circuit 25 is provided at the post stage of the sampling circuit 25.

When it is assumed that an imbalance sequence of 0 and 1 is $x_1, x_2, x_3, \ldots$, the smoothing operation can be performed by using $$y = x_1 \oplus x_2 \oplus \ldots \oplus x_n$$

where, $\oplus$ denotes an arithmetic operation indicative of the sum (exclusive OR) using modulo 2. It is shown that the sequence of "y" thus obtained is improved in terms of imbalance. That is, it is now assumed that an occurrence probability of 0 in the sequence of $x_1, x_2, x_3, \ldots$ is labelled to "p", an occurrence probability of 1 is set to (q=1−p), an appearing probability of 0 with respect to "y" is labelled to "P", and an appearing probability of 1 is set to (Q=1−P). The imbalance of "y" is given by $$P - Q = (p - q)^n$$

where, "n" is a block size in the smoothing operation. When "n" is set to a large value, the imbalance becomes exponentially smaller.

Although the smoothing unit 35 has been explained as a configuration of hardware in FIG. 4, it can be easily realized in practice by software of a computer. It is sufficient to perform the smoothing operation in a scale (i.e., size of a block) required by a computer. By performing the foregoing process, the sequence of 0 and 1 which can be truly random can be obtained.

Although the case of using the Zener diode as a noise generating source has been described in the embodiments, the invention is not limited to the case. For example, a semiconductor junction of a hetero-junction may be employed and its breakdown current can be used as a noise generating source.

As described above in detail, according to the present invention, by using the breakdown current of the semiconductor junction as a noise generating source, the random number generating apparatus which can easily generate the binary random numbers that are cryptographically secure and is suitable for miniaturization can be realized.

What is claimed is:

1. A random number signal generating apparatus comprising:
   a semiconductor device having a junction;
   a reverse bias applying circuit for applying a reverse bias voltage of a degree so as to cause a breakdown current in said junction;
   an amplifying circuit for amplifying a noise signal created in a current path including said junction to produce an amplified noise signal;
   DC-component removing means for removing a DC-component from the amplified noise signal to obtain a resultant noise signal;
   sampling means for sampling the resultant noise signal in said DC-component removing means to output a sampling value sequence; and
   a smoothing circuit for consecutively applying a logical calculation to each one of multiple sampling value blocks truncated from said sampling value sequence to generate a sequence of resultant values consisting of 0s and 1s as a random number signal, the logical calculations being performed such that occurrence probabilities of 0 and 1 in said resultant values are substantially equalized.

2. An apparatus according to claim 1, wherein said semiconductor device is a Zener diode.

3. A random number signal generating apparatus comprising:
   a semiconductor device having a junction;
   a reverse bias applying circuit for applying a reverse bias voltage of a degree so as to cause a breakdown current in said junction;
   an amplifying circuit for amplifying a noise signal created in a current path including said junction to produce an amplified noise signal;
   DC-component removing means for removing a DC-component from the amplified noise signal to obtain a resultant noise signal;
   a comparison circuit for comparing the resultant noise signal in said DC-component removing means with a predetermined reference voltage for obtaining a binary signal;
   sampling means for sampling said binary signal for obtaining a sampling value sequence consisting of 0s and 1s; and
   a smoothing circuit for consecutively applying a logical calculation to each one of multiple sampling value blocks truncated from said sampling value sequence to generate a sequence of resultant values consisting of 0s and 1s as a random number signal, the logical calculations being performed such that occurrence probabilities of 0 and 1 in said resultant values are substantially equalized.

4. An apparatus according to claim 3, wherein said semiconductor device is a Zener diode.

5. An apparatus according to claim 4, further comprising: a control circuit for controlling said reference voltage so as to substantially equalize an occurrence probability of 0 and 1 in said sampling value sequence.

6. An apparatus according to claim 3, further comprising: a control circuit for controlling said reference voltage so as to substantially equalize an occurrence probability of 0 and 1 in said sampling value sequence.

7. An apparatus according to claim 3, wherein said predetermined reference voltage is a ground voltage.

8. A method for generating a random number signal, comprising the steps of:
   utilizing a semiconductor device having a junction;
   applying a reverse bias voltage to said junction and causing a breakdown current in said junction;
   amplifying a noise signal created in a current path including said junction to produce an amplified noise signal;
   removing a DC-component from the amplified noise signal to obtain a resultant noise signal,
   sampling the resultant noise signal in said removing step to output a sampling value sequence as random numbers; and
   consecutively applying a logical calculation to each one of multiple sampling value blocks truncated from said sampling value sequence to generate a sequence of resultant values consisting of 0s and 1s as a random number signal, the logical calculations being performed such that occurrence probabilities of 0 and 1 in said resultant values are substantially equalized.

9. A method according to claim 8, including:
   utilizing a Zener diode as said semiconductor device.

10. A method for generating a random number signal, comprising the steps of:
    utilizing a semiconductor device having a junction;
    applying a reverse bias voltage to said junction and causing a breakdown current in said junction;
    amplifying a noise signal created in a current path including said junction to produce an amplified noise signal;
    removing a DC-component from the amplified noise signal to obtain a resultant noise signal;
    comparing the resultant noise signal in said removing step with a predetermined reference voltage and obtaining a binary signal;
    sampling said binary signal and obtaining a sampling value sequence consisting of 0s and 1s; and
    consecutively applying a logical calculation to each one of multiple sampling value blocks truncated from said sampling value sequence to generate a sequence of resultant values consisting of 0s and 1s as a random number signal, the logical calculations being performed such that occurrence probabilities of 0 and 1 in said resultant values are substantially equalized.

11. A method according to claim 10, including:
    utilizing a Zener diode as said semiconductor device.

12. A method according to claim 11, further comprising a step of controlling said reference voltage and substantially equalizing an occurrence probability of 0 and 1 in said sampling value sequence.

13. A method according to claim 10, further comprising a step of controlling said reference voltage and substantially equalizing an occurrence probability of 0 and 1 in said sampling value sequence.

14. A method according to claim 10, wherein said predetermined reference voltage is a ground voltage.

* * * * *